No. 792,995. Patented June 20, 1905.

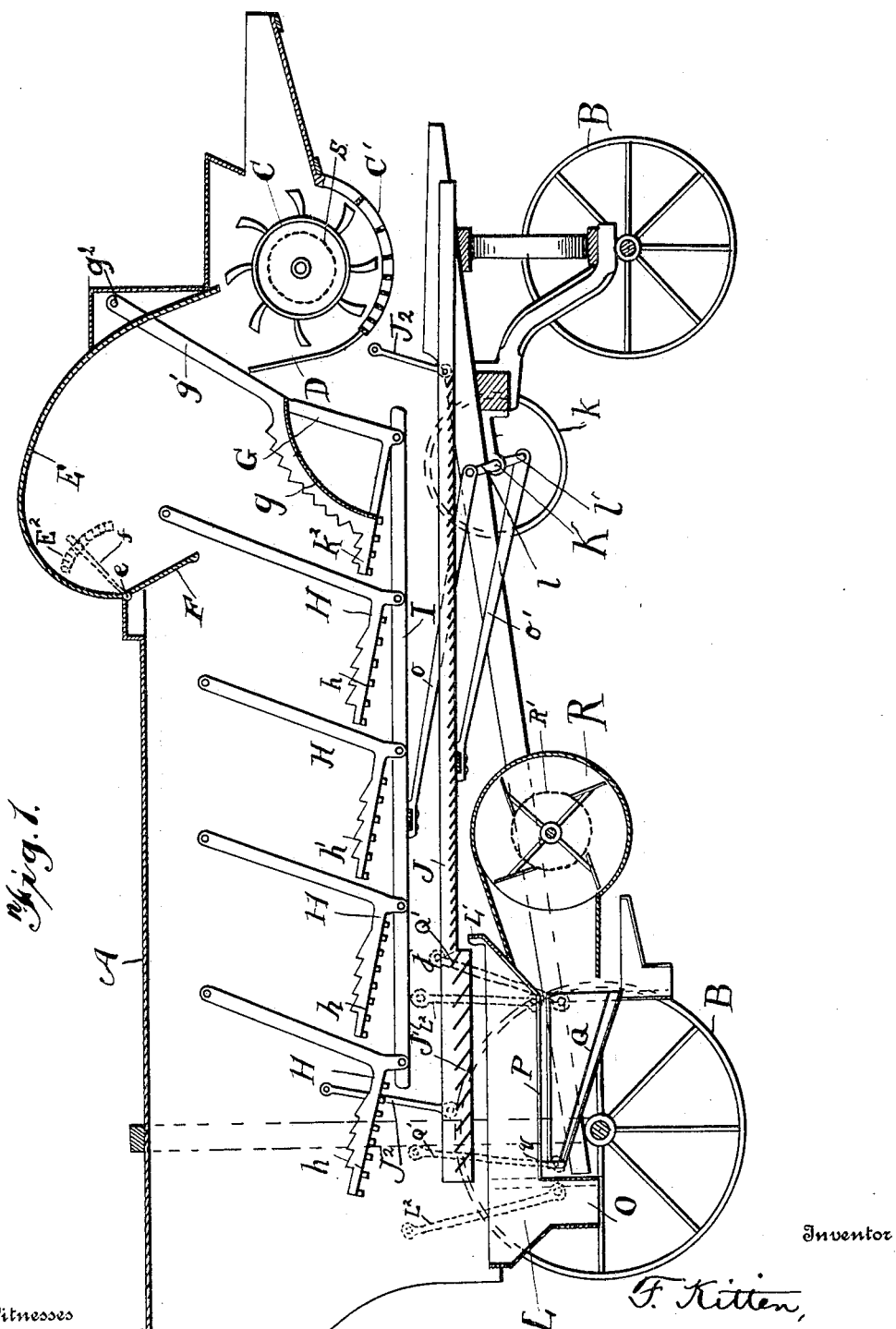

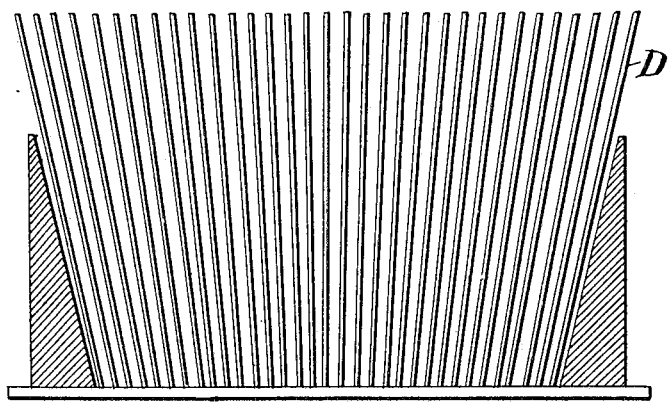
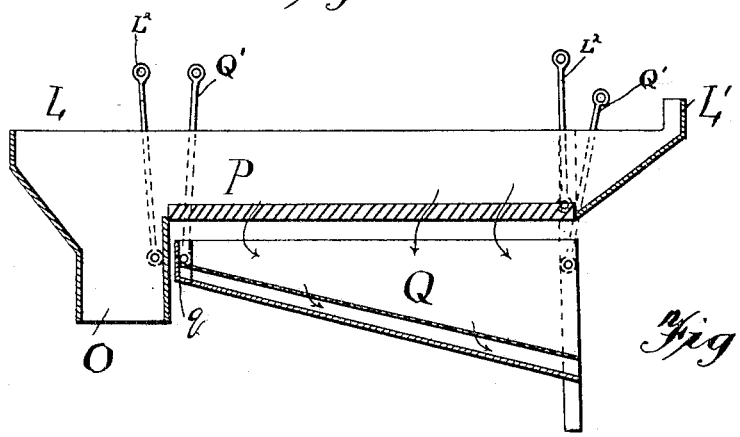
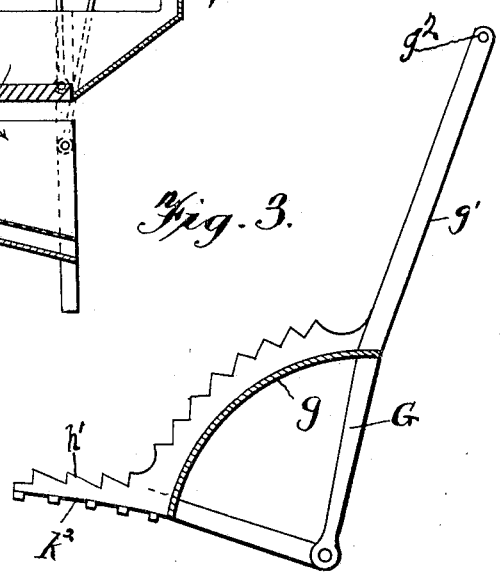

UNITED STATES PATENT OFFICE.

FLORENS KITTEN, OF FERDINAND, INDIANA.

THRESHING-MACHINE.

SPECIFICATION forming part of Letters Patent No. 792,995, dated June 20, 1905.

Application filed November 12, 1901. Serial No. 82,017.

*To all whom it may concern:*

Be it known that I, FLORENS KITTEN, a citizen of the United States, residing at Ferdinand, in the county of Dubois and State of Indiana, have invented new and useful Improvements in Threshing-Machines, of which the following is a specification.

My invention relates to improvements in threshing-machines, and in which I provide an upwardly-inclined grate or finger-bar located just behind the threshing-cylinder, a curved shield against which the straw is thrown and turned over, and a shaking-pan below said finger-bars and shield and adapted to receive the grain therefrom. The shield prevents the straw from being thrown too far into the machine and turns it over, so that the grain remaining in the straw will fall upon the shaker-pan and pass therefrom at its outer end and the straw falling upon the straw-shaker and conveying apparatus above the shaker-pan. I also provide the inner end of the curved shield with an adjustable board, whereby the straw can be directed down upon the straw shaker and conveyer at any desired point to effect the best results, all of which will be hereinafter more fully described.

The object of my invention is to so handle the straw that all of the grain will be taken therefrom and preventing any being conveyed out with the straw.

In the accompanying drawings, Figure 1 is a longitudinal vertical sectional view of a threshing-machine embodying my invention.
Fig. 2 is a detached plan view of the finger-bar or grate. Fig. 3 is a detached side elevation of one section forming my straw shaker and conveyer. Fig. 4 is a detached enlarged sectional view of my improved shoe or riddle box made in two parts.

Referring now to the drawings, A represents a casing suitably mounted upon wheels B for the purpose of transportation, and located in the forward end of said casing is a threshing-cylinder C. The said cylinder may be of any structure, but preferably that shown in the drawings, and is mounted in a concave C', which is made of a solid form and provided at its rear end with the upwardly-extending curved finger-bars D, which are arranged radially and form a grate to guide the straw upwardly therefrom and the loose grain passing through the bar D. Located above the said finger-bars is a curved shield E, forming a part of the casing A and against which the straw, with what grain has not fallen through the finger-bar, is directed by the said finger-bars. The straw follows the curved shield E and is turned over and is directed upon the shakers G by the deflector-plate F. The said deflector-plate F is pivoted at *e* to the end of the curved shield E, and said pivotal connection at one side extends through the casing A and carries an arm *f*, by means of which it can be moved at different angles, thus directing the straw and remaining grain on different parts of the combined straw shaker and conveyer. In order to hold the deflector F at the desired angle, I provide the outside of the shield E with a segmental rack-bar $E^2$, over which the lever *f* is adapted to be sprung and held in the desired position, thus holding the deflector in the desired position.

The shaker G is located directly below the curved shield E, and said shaker is formed of a curved solid bottom *g* and adapted to receive the grain and straw, and carried by the lower end of said curved portion *g* is a slightly upwardly inclined slatted portion $h^2$, which is adapted to hold the straw and allow the grain to pass therethrough. The upper end of the shaker G is provided with an upwardly-extending arm *g'*, having its upper end pivoted to the casing A at $g^2$ and by means of which the same is swingingly supported. Supported in a similar manner within the casing are a number of shakers H, which are provided with only the slightly upwardly inclined slatted portions *h*, all of which have their lower ends pivoted to a horizontal bar I, by means of which the shakers are oscillated. The said shakers H and G have the rearwardly-extending teeth-like members *h'*, which are adapted to engage the straw and carry it rearwardly from one shaker to the other and is finally discharged from the open rear end of the casing A. During the rearward travel of the straw it will be clearly seen that all of the grain will be shaken from the straw and passed through the slatted portions of the shakers and deposited upon the shaker-pan J, which is slightly rearwardly inclined for conveying the grain to the rear end. The said pan is swingingly supported by the links $J^2$, and connected to said pan and bar I are operating levers or links $o$ and $o'$, which have their ends connected to the cranks $l$ and $l'$, carried by the shaft K, and said shaft is driven by the pulley-wheel $k$, which may be driven by a belt from the cylinder-driving shaft or from the engine direct, and thus the pan and shakers are reciprocated in opposite directions.

The rear end of the pan J is slightly depressed and is formed with a screen-bottom, through which the grain passes to the screens P and Q, which are of different mesh, and said screen P is reciprocated by the engagement thereof with the depression $J'$ of the pan, and the screen Q is reciprocated by the screen P. In communication with said screen is a blower, in which the chaff and lighter grain may be blown from the good grain.

Having thus described my invention, what I claim, and desire to secure by Letters Patent, is—

1. A threshing-machine, comprising a concave, a cylinder therein, upwardly-curved radially-arranged finger-bars carried by the rear edge of said concave, a curved deflecting-shield above said fingers, an adjustable plate at the rear end of said shield, independently-pivoted shakers below said shield, a shaking-pan below said shield and means for moving the shakers and the shaking-pan in opposite directions.

2. A threshing-machine, comprising a concave, a cylinder therein, upwardly-curved radially-arranged finger-bars carried by the rear edge of said concave, a curved deflector-shield above said fingers, an adjustable plate at the rear end of said shield, means for holding the said plate in its adjusted position, a shaker below said plate and having a curved solid portion and an upwardly-inclined slatted portion, shakers in rear of said shaker and composed of upwardly-inclined slatted portions, and independently supported at their upper ends, a horizontal bar pivotally connecting the lower ends of said shakers, means for rocking said bar, a shaker-pan below said shaker, means for rocking said pan in the opposite direction to the shakers, and a screening device adapted to receive the grain from said pan.

In testimony whereof I have hereunto set my hand in the presence of two subscribing witnesses.

FLORENS KITTEN.

Witnesses:
JOSEPH F. KITTEN,
FRANK HERZÉ.